(12) United States Patent
Papathanasiou et al.

(10) Patent No.: US 10,895,479 B2
(45) Date of Patent: Jan. 19, 2021

(54) ULTRASONIC FLOWMETER

(71) Applicant: Endress+Hauser Flowtec AG, Reinach (CH)

(72) Inventors: Panagiotis Papathanasiou, Basel (CH); Michal Bezdek, Aesch (CH); Vivek Kumar, Allschwil (CH); Oliver Berberig, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/493,383

(22) PCT Filed: Feb. 15, 2018

(86) PCT No.: PCT/EP2018/053779
§ 371 (c)(1),
(2) Date: Sep. 12, 2019

(87) PCT Pub. No.: WO2018/166742
PCT Pub. Date: Sep. 20, 2018

(65) Prior Publication Data
US 2020/0072649 A1    Mar. 5, 2020

(30) Foreign Application Priority Data
Mar. 14, 2017  (EP) .................................... 17160814

(51) Int. Cl.
G01F 1/66 (2006.01)
(52) U.S. Cl.
CPC .............. G01F 1/662 (2013.01); G01F 1/667 (2013.01)

(58) Field of Classification Search
CPC ........................................................ G01F 1/66
See application file for complete search history.

(56) References Cited

U.S. PATENT DOCUMENTS 3,906,791 A * 9/1975 Lynnworth ............... G01F 1/66
                                                73/861.29
9,528,866 B2   12/2016 Wiest et al.
(Continued)

FOREIGN PATENT DOCUMENTS

CN        1668895 A      9/2005
CN      101672671 A      3/2010
(Continued)

OTHER PUBLICATIONS

Endress+Hauser, Technical Information Proline Prosonic Flow B 200, Ultrasonic transmit time flowmeter, 52 pp.

*Primary Examiner* — Jewel V Dowtin
(74) *Attorney, Agent, or Firm* — Christopher R. Powers; Endress+Hauser (USA) Holding Inc.

(57) ABSTRACT

The present disclosure describes an ultrasonic flowmeter including: a measuring tube with a measuring tube wall and at least one pair of housings extending to an outer side of the measuring tube wall; a pair of ultrasonic transducers, each with a transducing element for generating and/or sensing ultrasonic pulses and a transducer body, wherein each of the housings is arranged to house one of the transducers, and wherein the housings have an inner first diameter; wherein transducer body includes a circumferential surface, and wherein the transducer body includes an end face, wherein the end face has a second diameter, and wherein the transducer includes at least one first protrusion protruding from the circumferential surface into a gap between the transducer body and the housing.

17 Claims, 4 Drawing Sheets

(56) References Cited

U.S. PATENT DOCUMENTS

| | | | |
|---|---|---|---|
| 10,359,305 B2* | 7/2019 | Drachmann | H04R 31/006 |
| 2011/0162461 A1 | 7/2011 | Allen | |
| 2012/0067135 A1 | 3/2012 | Allen | |
| 2013/0312537 A1* | 11/2013 | Miyata | G01F 15/14 |
| | | | 73/861.28 |
| 2015/0114134 A1* | 4/2015 | van Klooster | G01F 1/66 |
| | | | 73/861.24 |
| 2015/0204704 A1 | 7/2015 | Wiest et al. | |

FOREIGN PATENT DOCUMENTS

| | | |
|---|---|---|
| CN | 102062623 A | 5/2011 |
| CN | 102235895 A | 11/2011 |
| CN | 104596600 A | 5/2015 |
| JP | 2004125473 A | 4/2004 |

\* cited by examiner

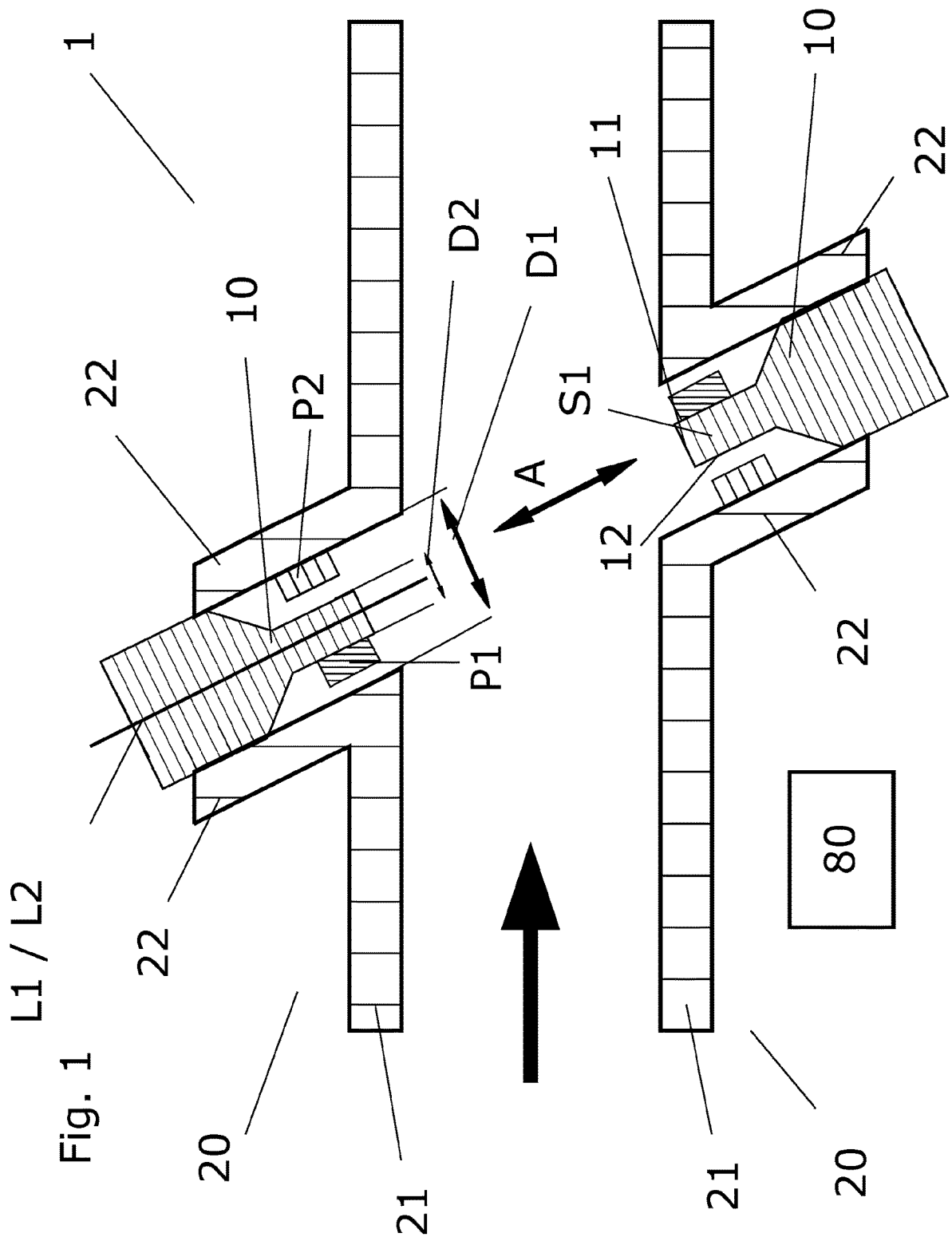

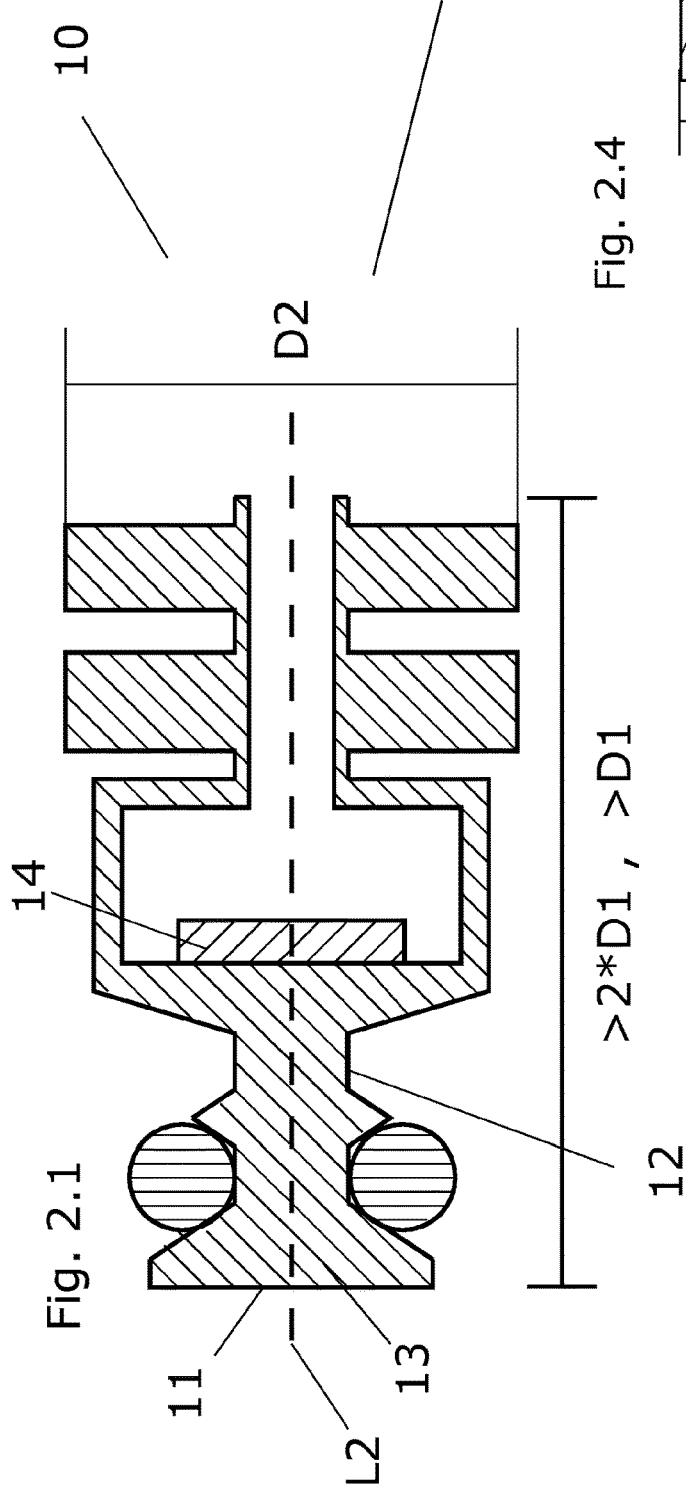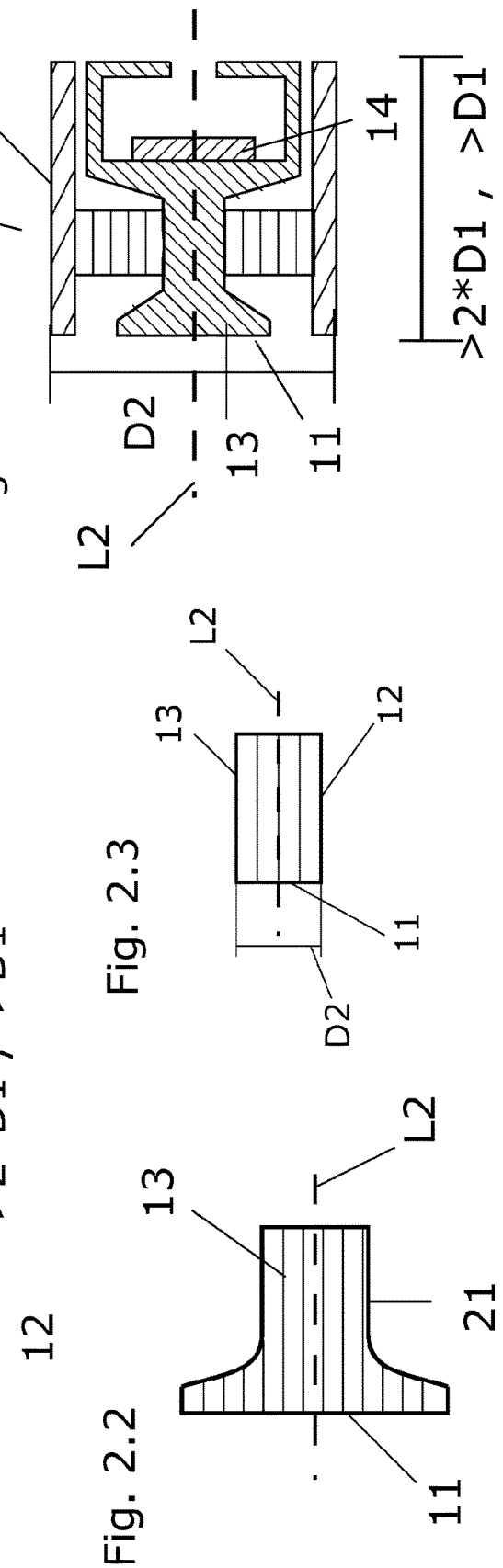

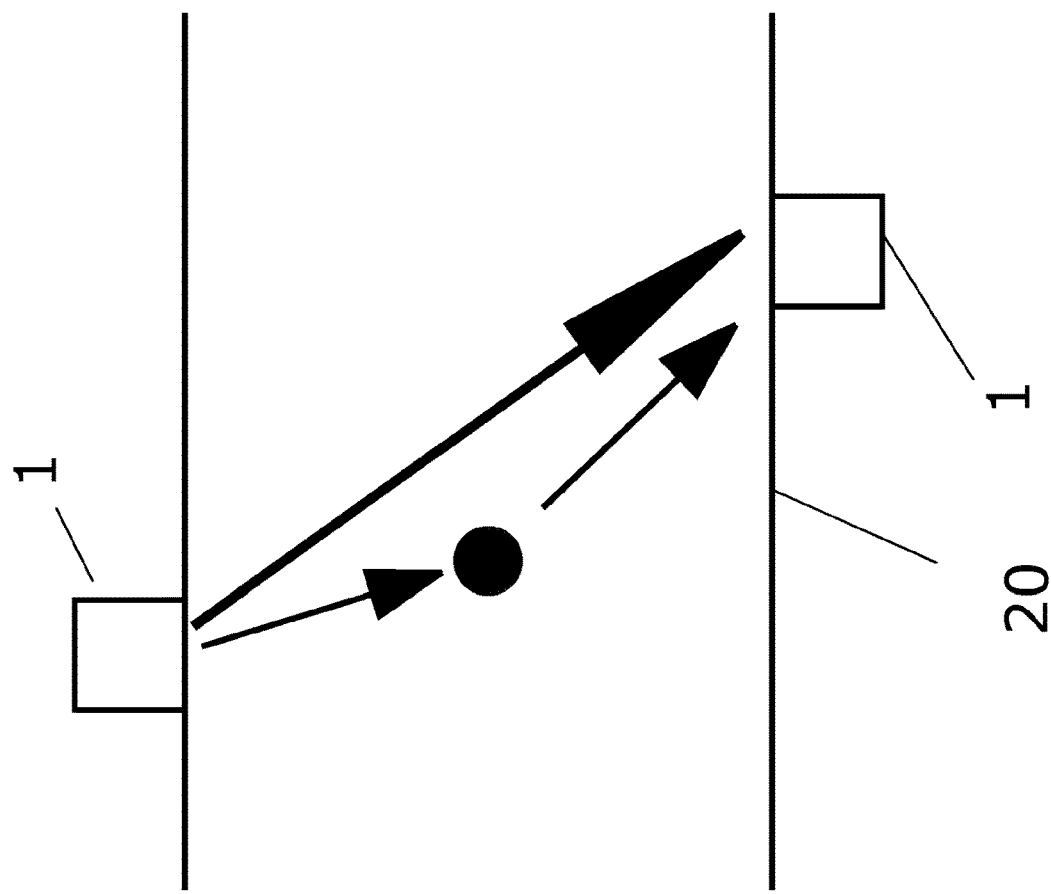
Fig. 4.2
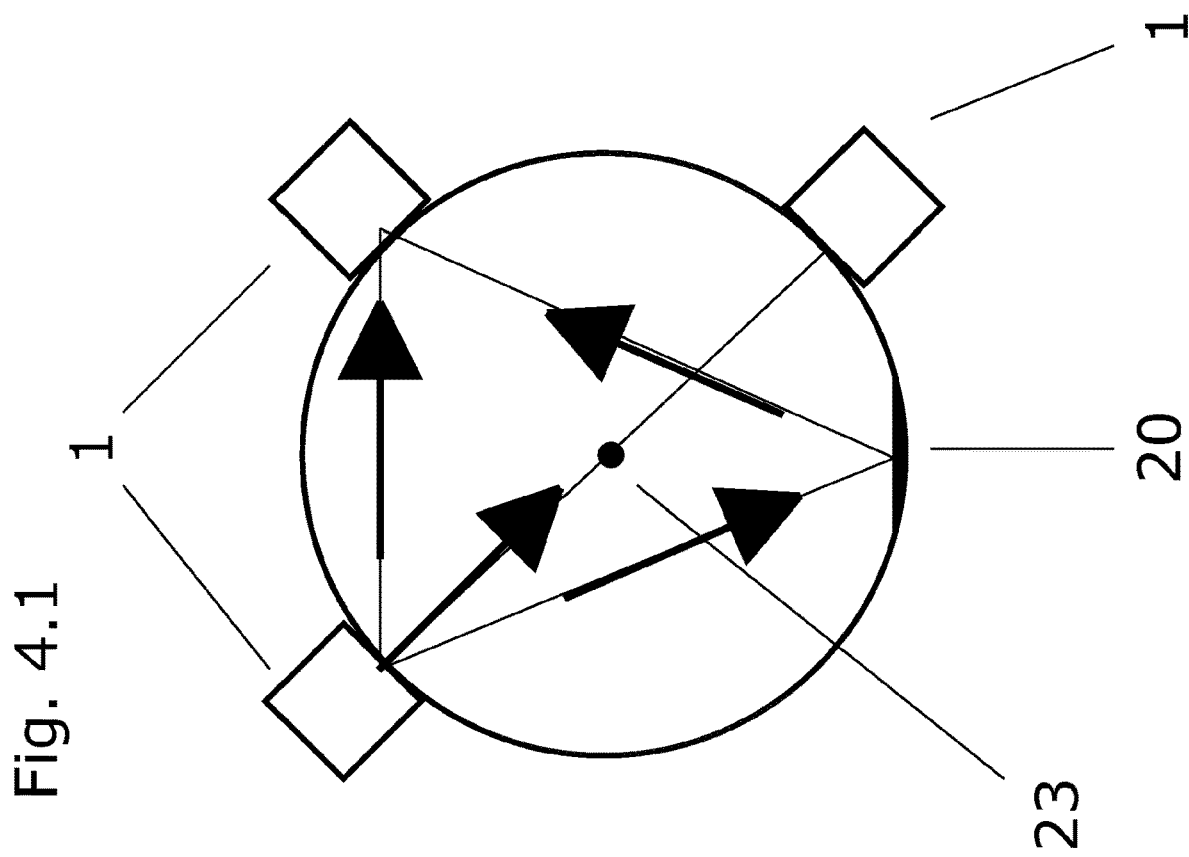
Fig. 4.1

ULTRASONIC FLOWMETER

CROSS-REFERENCE TO RELATED APPLICATIONS

The present application is related to and claims the priority benefit of European Patent Application No. 17160814.4, filed on Mar. 14, 2017 and International Patent Application No. PCT/EP2018/053779 filed on Feb. 15, 2018, the entire contents of which are incorporated herein by reference.

TECHNICAL FIELD

This invention concerns to ultrasonic flowmeters for measuring a flowspeed or a volume flow of a medium through a measuring pipe.

BACKGROUND

The patent application WO2014012707A1 for example describes such an ultrasonic flowmeter, wherein ultrasonic transducers are installed within a measuring tube in order to generate and/or sense ultrasonic pulses sent along a path through said measuring tube to a sensing transducer. The flow of a medium through said measuring tube influences the travel time of said pulses between said generating transducer and said sensing transducer dependent on the flow speed and on the flow direction of said medium. Important for any flowmeter is a good linearity between a measured flow and a real flow considering a flow range ranging from a slow medium to a fast medium. Unfortunately, there are several disturbing effects which make the achievement of said linearity difficult. Especially problematic is the region around the transducer, as lumps and bumps of said transducer as well as of a housing of said transducer may cause vortices of said medium close to the transducer such that the travel time of ultrasonic pulses may be heavily influenced. On top of that, the influence of said vortices on the travel time of said pulses also show a complex dependency from flow speed. The problem to be solved by the invention is to reduce the influence of said vortices on the travel time of said ultrasonic pulses.

SUMMARY

The problem is solved by an ultrasonic flowmeter as claimed by claim 1 of the application.

An ultrasonic flowmeter according to the invention for measuring the flow of a medium flowing through a measuring tube comprises:

a measuring tube with a measuring tube wall for guiding said medium and at least one pair of housings extending to an outer side of said measuring tube wall;

at least one pair of ultrasonic transducers each with a transducing element for generating and/or sensing ultrasonic pulses and a transducer body containing said transducing element, wherein said ultrasonic pulses travel between said transducers along a path, wherein at least one subpath of a path extending between said pair of transducers is non-parallel to a measuring tube axis of said measuring tube;

an electronic circuit for operating said ultrasonic transducers and for evaluating of sensed ultrasonic pulses, wherein each of said housings is arranged to house one of said transducers, and wherein said housings comprise an inner surface and a first longitudinal axis and an inner first diameter orthogonal to said first longitudinal axis, wherein said transducer body comprises a circumferencial surface and a second longitudinal axis, and wherein said transducer comprises an end face exposable to said medium, wherein said end face is set for transferring said ultrasonic pulses between said transducing element and said medium and vice versa, and wherein a first sector (of said transducer comprising said end face of said transducer body has a maximum second diameter orthogonal to said second longitudinal axis, wherein said housing encompasses said circumferencial surface at least partially, and wherein said transducer comprises at least one first protrusion protruding from said circumferencial surface into a gap between said transducer body and said housing, wherein a height of the first protrusion is smaller than the width of said gap and/or wherein said housing comprises at least one second protrusion protruding from said circumferencial surface into said gap, wherein a height of the second protrusion is smaller than the width of said gap.

This feature prevents a rotational flow around the transducer when said first and/or last subpath of said path is skew with said measuring tube axis. The asymmetric allocation of said housing and said transducer with respect to said measuring tube in this case causes a rotational flow in said gap which extends to a region in front of said end face creating a vortex of the medium in front of said end face. Suppressing said vortex with the help of said first protrusion improves the measurement performance of said ultrasonic flowmeter.

In an embodiment of said ultrasonic flowmeter the height of said first protrusion is at least 20% and especially at least 40% of said width of said gap. In order to provide a resistance for said rotational flow, the height of said first protrusion has to cross a least value.

In an embodiment of said ultrasonic flowmeter the height of said second protrusion is at least 20% and especially at least 40% of said width of said gap. In order to provide a resistance for said rotational flow, the height of said second protrusion has to cross a least value.

In an embodiment of said ultrasonic flowmeter a positioning of said first protrusion is tangentially offset to a positioning of said second protrusion. With that feature a rotational flow is forced to a zigzag-movement further increasing the resistance for the rotational flow.

In an embodiment of said ultrasonic flowmeter a ratio of said second diameter and said first diameter is within a first interval 11 or a second interval 12, wherein said intervals do not overlap, wherein an upper bound of said first interval is smaller than 1 and wherein a lower bound of said first interval is bigger than at least 0.87 and especially at least 0.90 and preferred at least 0.95, and wherein an upper bound of said second interval is bigger than 0.1 and wherein a lower bound of said second interval is smaller than 0.62 and especially smaller than 0.55 and preferred smaller than 0.52.

The advantage of installing such a ratio is to place a vortex of the medium created at an edge of said housing and said measuring tube upstream of said end face aside of said end face. Hence, the complex behavior of said vortex dependent on the flow speed of said medium and the influence of said vortex on the travel time of said ultrasonic pulses is limited. It has been found, that the vortex is sufficiently spaced apart from said end face when arranging said ratio within said first interval or second interval.

Said transducing element may be a piezoelectric element.

Said transducer body may be fabricated out of one or more of following materials:

steel, alumina, titanium, magnesium, glass, alloy comprising nickel and/or molybdenum and/or copper.

In an embodiment of said ultrasonic flowmeter a first and/or last subpath of said path is skew with said measuring tube axis.

In an embodiment of said ultrasonic flowmeter said first longitudinal axis and said second longitudinal axis are parallel to each other.

In an embodiment of said ultrasonic flowmeter said transducer body is axially symmetric with respect to said second longitudinal axis.

In an embodiment of said ultrasonic flowmeter said inner surface follows a cylindric shape.

In an embodiment of said ultrasonic transducer the fabrication of said measuring tube comprises welding and/or casting.

In an embodiment of said ultrasonic flowmeter said flowmeter comprises a multitude of said pairs of housings and said pairs of transducers.

In an embodiment of said ultrasonic flowmeter said flowmeter is set for flow measurement based on measuring a difference of a transit time of an ultrasonic pulse traveling upstream of said medium and a transit time of an ultrasonic pulse traveling downstream of said medium, and wherein within a range of flow speed of said medium along said measuring tube axis a relation between a real flow and a measured flow essentially follows a linear function of said real flow.

In an embodiment of said ultrasonic flowmeter a lower limit of said range is less than 10 m/s and especially less than 5 m/s and preferably less than 2.5 m/s and/or wherein an upper limit of said range is more than 20 m/s and especially more than 30 m/s and preferably more than 40 m/s.

In an embodiment of said ultrasonic flowmeter a deviation of said measured flow from said linear function is less than 3% and especially less than 1.5% and preferably less than 0.5% of said real flow.

BRIEF DESCRIPTION OF THE DRAWING

In the following the invention is described with the help of exemplary embodiments.

FIG. 1 shows a cross section of an ultrasonic flowmeter according to the invention with a pair of ultrasonic transducers.

FIGS. 2.1-2.4 show outlines of a first sector of an ultrasonic transducer body according to the invention comprising an end face of said transducer.

FIGS. 4.1 and 4.2 illustrate different signal paths with one or two signal subpaths.

DETAILED DESCRIPTION

Figure 3:
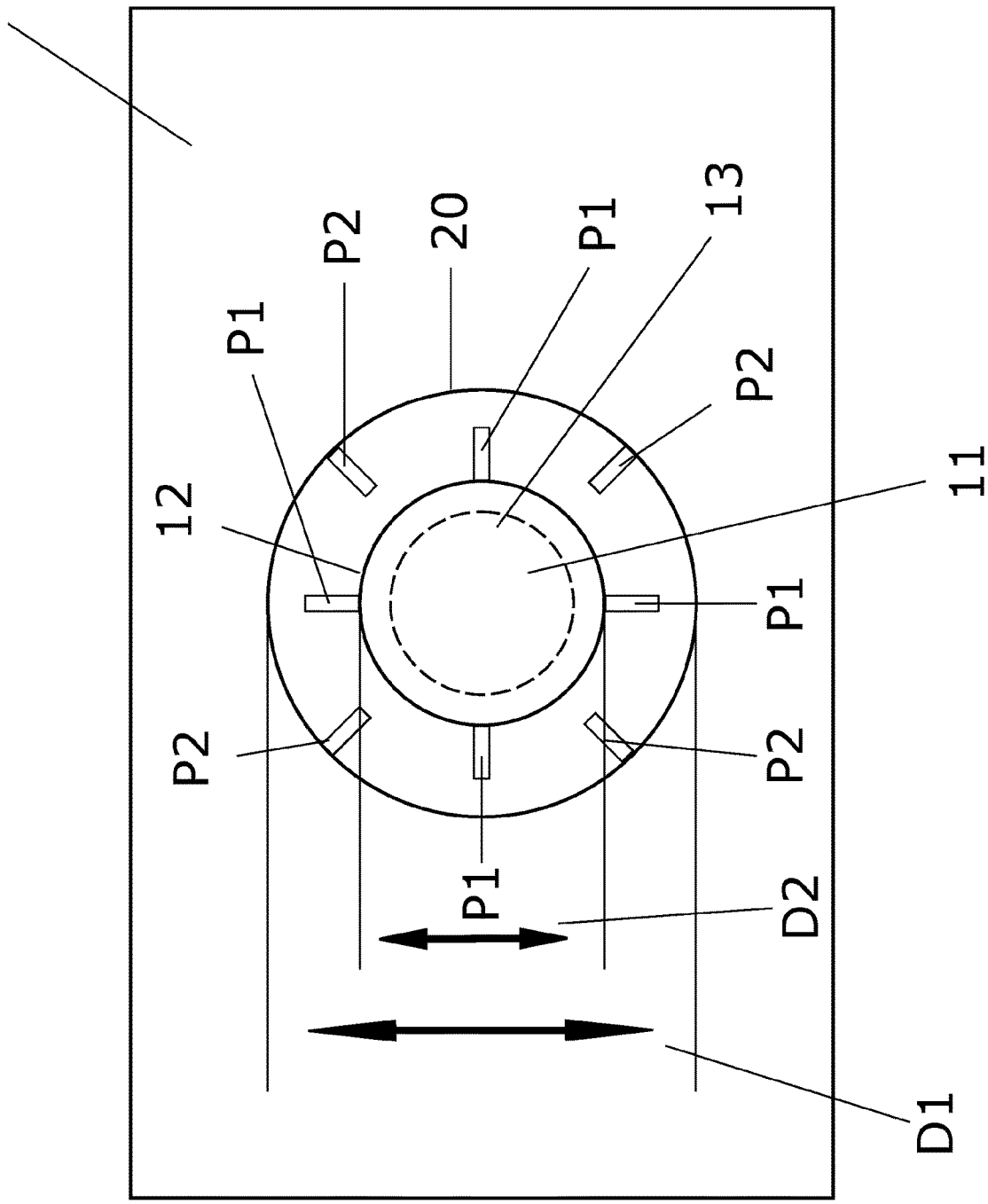
FIG. 3 shows a front view of an ultrasonic transducer according to the invention from a direction A as shown in FIG. 1.

FIG. 1 shows a schematic simplified longitudinal section of an ultrasonic flowmeter 1 comprising a measuring tube 20, a pair of ultrasonic transducers 10 each with a second longitudinal axis L2, which ultrasonic transducers 1 are each placed in a housing 22, which housings being included to the measuring tube, wherein each housing 22 has a first longitudinal axis L1. The housing has an inner first diameter D1, and a transducer body 13 of said ultrasonic transducer 10 in a region comprising an end face 11 exposable to a medium flowing through said measurement tube has a maximum second diameter D2 in a region comprising said end face 11.

A flow break-away edge of an opening of said housing 22 towards said measuring tube 20 upstream of said end face 11 of said ultrasonic transducer 10 may cause a first vortex of said medium being located in front of said end face with a rotational axis approximately perpendicular to a first longitudinal axis of said housing.

Ultrasonic pulses generated by a transducing element, see FIGS. 2.1 and 2.4, for example a piezoelectric transducer, of said ultrasonic transducer and transferred by said end face into said medium will be influenced in case said first vortex is located in front of said end face. In a similar manner, ultrasonic pulses having travelled along a path from a generating ultrasonic transducer to a sensing ultrasonic transducer of a pair of ultrasonic transducers will be influenced by a first vortex in front of said end face 11 of said sensing ultrasonic transducer 10. In order to avoid said first vortex being located in front of said end face, it proved to be advantageous to install a ratio of said second diameter and said first diameter within a first interval 11 or a second interval 12, wherein said intervals do not overlap, wherein an upper bound of said first interval is smaller than 1 and wherein a lower bound of said first interval is bigger than at least 0.87 and especially at least 0.90 and preferred at least 0.95 and wherein an upper bound of said second interval is bigger than 0.1 and wherein a lower bound of said second interval is smaller than 0.62 and especially smaller than 0.55 and preferred smaller than 0.52. With a ratio within said intervals 11 or 12 said first vortex is sufficiently spaced apart from said end face 11. A typical ultrasonic transducer 10 has a second diameter D2 between 5 millimeters and 16 millimeters. Reference numerals shown only at one of the transducers 10 apply for the other transducer 10 as well.

In an embodiment said transducer body is symmetric with respect to said second longitudinal axis L2 and/or said housing follows a cylindrical shape with respect to said first longitudinal axis.

In FIG. 1 said ultrasonic transducers 10 of a pair of transducers are facing each other such that said path of said ultrasonic pulses comprises only one subpath. However, said ultrasonic flowmeter is not limited in this manner, a path of said ultrasonic pulses may be a more complex path including several subpath which may be skew with said measuring tube axis, or perpendicular or intercepting with said measuring tube axis. The considerations concerning said first protrusion P1 and said second protrusion P2 are valid as well if said path comprises several subpath, wherein a first and/or a last subpath is skew with said measuring tube axis.

In case of a first or last subpath being skew with a measuring tube axis, the incident flow to the openings of said housings 22 will be asymmetric, such that a flow speed of a flow portion being closer to said measuring tube axis is higher than a flow portion being further from said measuring tube axis. Hence, inside a gap between a circumferential surface 12 of said transducer body 13 and said housing encompassing said circumferential surface at least partially, a rotational flow may be provoked. Said rotational flow may extend into said region comprising said end face 11 creating a second vortex with a rotational axis approximately perpendicular to said end face 11 influencing said ultrasonic pulses. In order to suppress the creation of said second vortex, said transducer body 13 comprises at least a first protrusion P1 protruding into said gap or/and said housing 20 comprises at least a second protrusion P2 protruding into said gap, which protrusions increase a flow resistance for said rotational flow inside said gap. In case said ultrasonic flowmeter 1 comprises both, at least one first protrusion and at least one second protrusion, a positioning of said first protrusion is tangentially offset to a positioning of said second protrusion. With that feature said rotational flow is forced to a zigzag-movement inside said gap further increasing the resistance for the rotational flow.

It is not necessary that the discussed applications for avoiding said first vortex being located in front of said end face 11 and for suppressing said second vortex being located in front of said end face 11 are installed both at the same time. Said ultrasonic flowmeter 1 according to the invention may comprise only at least one first protrusion and/or at least one second protrusion without installing a certain ratio of said second diameter D2 and said first diameter D1.

Said housing 20 may be welded to said measuring tube. However, the measuring tube and said housing 20 may be fabricated at the same time by casting.

Said ultrasonic flowmeter 1 further comprises an electronic circuit 80 for operating said ultrasonic transducers and for evaluating of sensed ultrasonic pulses, wherein said electronic circuit 80 is connected to said transducers via cable connections (not shown).

Said ultrasonic flowmeter 1 may comprise several pair of transducers 10 for measuring the flow of said medium with several ultrasonic pulse paths. Said path do not necessarily have a similar shape.

FIGS. 2.1-2.4 show more detailed longitudinal sections of said first sector S1 of exemplary ultrasonic transducers 10 according to the invention comprising said end face 11 of said transducer body 13.

FIG. 2.1 shows said first sector S1 comprising said ultrasonic transducer body 13, wherein a radial extension of said circumferential surface 12 decreases in a frontal part with increasing distance from said end face 11 such that said transducer body comprises within said frontal part a conically shaped section. An ultrasonic transducer according to the invention may comprise one or more damping rings surrounding said transducer body 13 as sketched by two round shapes. Said transducer body 13 may comprise a chamber for housing said transducing element 14. Said transducer body 13 with increasing distance to said end face 11 may further comprise one or more widenings. Relevant for a determination of said second diameter D2 is a maximum diameter of said transducer within an area of said ultrasonic transducer 10 comprising said end face 11 along said second longitudinal axis L2 within a range of less than two times said first diameter D1 and preferably less than D1 from said end face 11. D2 is a maximum diameter of the transducer within said range. In case of the sketched embodiment said second diameter D2 is the diameter of said widenings. In another embodiment with said widenings having a smaller radial extension than said chamber the second diameter D2 is determined by the radial extension of said chamber. In another embodiment said second diameter D2 may be determined by said damping ring or by said end face 11.

FIG. 2.2 shows an alternative embodiment of said frontal part of said ultrasonic transducer body 13 as shown in FIG. 2.1, wherein a radial extension of said circumferential surface 12 decreases in a section with increasing distance from said end face 11 wherein the decreasing is nonlinear.

FIG. 2.3 shows an alternative embodiment of said frontal part of said ultrasonic transducer body 13 as shown in FIG. 2.1, wherein a radial extension of said circumferential surface 12 is mainly constant.

FIG. 2.4 shows a first sector of another embodiment of said ultrasonic transducer with a chamber for housing said transducing element as shown in FIG. 2.1 further comprising a protecting sleeve and a sealing/damping-element, wherein said ultrasonic transducer body 13 is surrounded by said protecting sleeve at least partially, wherein said sealing/damping-element is arranged in order to seal said chamber from said medium. Similar to the embodiment of said ultrasonic transducer as discussed in FIG. 2.1, relevant for a determination of said second diameter D2 is a maximum diameter of said transducer within a range of less than two times said first diameter D1 and preferably less than D1 from said end face 11. D2 is a maximum diameter of the transducer within said range. In case of the sketched embodiment said second diameter D2 is a maximum outer diameter of said protecting sleeve such that said circumferential surface is a surface of said protecting sleeve.

FIG. 3 shows a simplified front view of an ultrasonic transducer according to the invention from a direction A as shown in FIG. 1, wherein said end face 11 of said ultrasonic transducer, four first protrusions P1 of said transducer 10 and four second protrusions P2 of said housing 20 are shown, and wherein the positioning of said first protrusion P1 is tangentially offset to a positioning of said second protrusion P2. The first protrusions are placed on said circumferential surface 12.

The first and/or second protrusions have a height of at least 20% and especially at least 40% of said width of said gap. This may also be valid for an ultrasonic flowmeter with any number of first protrusions P1 and second protrusions P2. In case of gaseous media it is advantageous, if said protrusions have a height less than 90% of said width of said gap in order to avoid coupling between said transducer body and said housing due to formation of droplets due to condensation of said medium or a component of said medium at an edge of said protrusions. It is advantageous if a tangential distance of said first protrusions P1 to each other is essentially constant. It is advantageous if a tangential distance of said second protrusions P2 to each other is essentially constant. The gap is surrounded by a measuring tube wall 21.

As sketched in FIG. 2.4, said ultrasonic transducer may comprise a protecting sleeve. In this case, the radial extension of said end face 11 is limited to the dashed circle such that said circumferential surface is a surface of said protecting sleeve.

In case of lack of said protection sleeve, the at least one first protrusion is placed within said first sector and preferably placed on an outer side of said chamber.

In case of provision of said protection sleeve, said at least one first projection is placed on an outer side of said protection sleeve.

An ultrasonic transducer according to the invention however does not necessarily need both, first protrusions and second protrusion. Such an ultrasonic transducer may also comprise only a first protrusion, or a second protrusion or no protrusions at all.

The applicant mentions, that the shown geometric dimensions shown in FIGS. 1 to 3.4 are merely schematic and may not be taken for restricting of the object of the invention.

Hence, the invention as shown in the description of FIGS. 1, 2.1-2.4, 3 is concerned with the avoidance of disturbing vortices in said path of ultrasonic pulses. For an ultrasonic flow meter it is important that a relation between a real flow and a measured flow is essentially linear in a flow range wherein a lower limit of said flow range is less than 10 m/s and especially less than 5 m/s and preferably less than 2.5 m/s and/or wherein an upper limit of said range is more than 20 m/s and especially more than 30 m/s and preferably more than 40 m/s.

It is advantageous if a deviation of said measured flow from said linear function is less than 3% and especially less than 1.5% and preferably less than 0.5% of said real flow. The application of said ratio of said second diameter D2 and said first diameter D1 and/or said first protrusion P1 and/or said second protrusion P2 helps for obtaining an essentially linear relation between said absolute deviation of said measured flow from said real flow and said real flow within said flow range, wherein said flowmeter is set for flow measurement based on measuring a difference of a transit time of an ultrasonic pulse traveling upstream of said medium and a transit time of an ultrasonic pulse traveling downstream of said medium, FIGS. 4.1 and 4.2 sketch different signal path between a pair of transducers with one or two signal subpath, wherein FIG. 4.1 shows a frontal projection of said signal path, and wherein FIG. 4.2 shows a side projection of said signal path.

FIG. 4.1 sketches three signal path, wherein a first signal path is a direct signal path between a pair of ultrasonic transducers such that said signal path is a first sub path and a last subpath, wherein said signal is skew with said measuring tube axis. A second signal path is also a direct path crossing said measuring tube axis 23. A third signal path comprises a first subpath between a generating transducer and a reflecting element and a second subpath between said second element and a receiving transducer. The reflecting element may be said measuring tube wall or a mirror installed on said measuring tube wall. A signal path may be extended such that it comprises more than two signal subpath.

FIG. 4.2 sketches a side projection of a direct subpath crossing a measuring tube axis and of a signal path comprising two subpath being reflected once at an reflecting element, which may be said measuring tube wall or a mirror installed on said measuring tube wall.

The invention claimed is:

1. An ultrasonic flowmeter for measuring the flow of a medium flowing through a measuring tube using the travel time difference principle, the flowmeter comprising:
    a measuring tube having a measuring tube axis and a measuring tube wall configured to guide the medium, the measuring tube including a pair of housings extending to an outer side of the measuring tube wall;
    a pair of ultrasonic transducers, each transducer including a circumferential surface, a transducing element adapted to generate and/or sense ultrasonic pulses, and a transducer body having a second longitudinal axis and containing the transducing element, wherein the ultrasonic pulses are transmitted between the pair of transducers along a path, wherein at least one subpath of a path extending between said pair of transducers is non-parallel to the measuring tube axis; and
    an electronic circuit configured to operate the ultrasonic transducers and to evaluate sensed ultrasonic pulses from the transducers,
    wherein each of the pair of housings is configured to house one of the pair of transducers therein, wherein each housing includes an inner surface, a first longitudinal axis and an inner first diameter orthogonal to the first longitudinal axis, and wherein each housing at least partially surrounds the circumferential surface of the corresponding transducer disposed therein,
    wherein each transducer includes an end face exposable to a medium, the end face configured to transmitting the ultrasonic pulses between the transducing element and the medium and vice versa, and wherein a first sector of the transducer including the end face has a second diameter orthogonal to the second longitudinal axis,
    wherein each transducer includes a first protrusion protruding from the circumferential surface into a gap between the transducer body and the corresponding housing, wherein a height of the first protrusion is smaller than a width of the gap, and/or
    wherein each housing includes a second protrusion protruding into the gap opposite the circumferential surface of the corresponding transducer, wherein a height of the second protrusion is smaller than the width of the gap.

2. The ultrasonic flowmeter of claim 1, wherein the height of the first protrusion is at least 20% of the width of the gap.

3. The ultrasonic flowmeter of claim 1, wherein the height of the second protrusion is at least 20% of the width of the gap.

4. The ultrasonic flowmeter of claim 1, wherein a positioning of the first protrusion is tangentially offset relative to a positioning of the second protrusion.

5. The ultrasonic flowmeter of claim 1, wherein a ratio of the second diameter and the first diameter is within a first range or a second range, wherein the first and second range do not overlap,
    wherein an upper bound of the first range is smaller than 1.0, wherein a lower bound of the first range is greater than at least 0.87, and
    wherein an upper bound of the second range is greater than 0.1, wherein a lower bound of the second range is smaller than 0.62.

6. The ultrasonic flowmeter of claim 5, wherein the lower bound of the first range is greater than at least 0.95, and wherein the lower bound of the second range is smaller than 0.52.

7. The ultrasonic flowmeter of claim 1, wherein a first and/or a last subpath of the path is skewed with the measuring tube axis.

8. The ultrasonic flowmeter of claim 1, wherein the first longitudinal axis and the second longitudinal axis are parallel to each other.

9. The ultrasonic flowmeter of claim 1, wherein the transducer body is axially symmetric with respect to the second longitudinal axis.

10. The ultrasonic flowmeter of claim 1, wherein the inner surface of each housing follows a cylindric shape.

11. The ultrasonic flowmeter of claim 1, wherein the measuring tube is at least partially formed by welding and/or casting.

12. The ultrasonic flowmeter of claim 1, wherein the flowmeter comprises a plurality of the pairs of housings and corresponding pairs of transducers.

13. The ultrasonic flowmeter of claim 1, wherein the flowmeter is configured for flow measurement based on measuring a difference of a transit time of the ultrasonic pulses traveling upstream of the medium and a transit time of the ultrasonic pulses traveling downstream of the medium, and
    wherein, within a range of flow speed of the medium along the measuring tube axis, a relation between an actual flow and a measured flow substantially follows a linear function of the actual flow.

14. The ultrasonic flowmeter of claim 13, wherein a lower limit of the range of flow speed is less than 10 meters per second (m/s), and/or
    wherein an upper limit of the range of flow speed is more than 20 m/s.

15. The ultrasonic flowmeter of claim 14, wherein the lower limit of the range of flow speed is less than 2.5 m/s, and/or
wherein the upper limit of the range of flow speed is more than 40 m/s.

16. The ultrasonic flowmeter of claim 13, wherein a deviation of the measured flow from the linear function is less than 3% of the actual flow.

17. The ultrasonic flowmeter of claim 16, wherein the deviation of the measured flow from the linear function is less than 0.5% of the actual flow.

* * * * *